US006201764B1

(12) United States Patent
Rice et al.

(10) Patent No.: US 6,201,764 B1
(45) Date of Patent: Mar. 13, 2001

(54) APPARATUS AND METHOD FOR CORRECTING FOR CAPACITANCE VARIATIONS IN HYDROPHONES

(75) Inventors: Charles Geoffrey Rice, Sugar Land; Paul Ellington Carroll, Houston; Thomas Glen Ragan, Sugar Land, all of TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 08/962,125

(22) Filed: Oct. 31, 1997

(51) Int. Cl.[7] .................................................. G01V 1/38
(52) U.S. Cl. ............................ 367/21; 367/21; 367/13; 367/24; 367/135; 367/43; 367/911; 181/110
(58) Field of Search ............................ 367/21, 13, 24, 367/135, 43, 911; 181/110

(56) References Cited

U.S. PATENT DOCUMENTS 4,979,150 * 12/1990 Barr ........................................ 367/24
5,163,028 * 11/1992 Barr et al. .............................. 367/13
5,235,554 * 8/1993 Barr et al. .............................. 367/13

OTHER PUBLICATIONS

G.M. Hoover et al., "The Influence of the planted geophone on seismic land data", Geophysics, vol. 45, No. 8, pp. 1239–1253, Aug. 1980.*

Christine E. Krohn, "Geophone ground coupling", Geophysics, vol. 49, No. 6, pp. 722–731, Jun. 1984.*

T. H. Tan, "Reciprocity theorem applied to the geophone–ground coupling problem", Geophysics, vol. 52, No. 12, pp. 1715–1717, Dec. 1987.*

Barr et al.—A Dual–Sensor, Bottom–Cable 3–D Survey in the Gulf of Mexico, Sep. 23, 1990.

* cited by examiner

Primary Examiner—John Barlow
Assistant Examiner—Anthony Jolly
(74) Attorney, Agent, or Firm—Haynes & Boone; Tim Headley

(57) ABSTRACT

A method and an apparatus are provided for matching the response of hydrophones 22 to the response of geophones 24 and significantly reducing response variations between hydrophones caused by inherent characteristics. The method includes the steps of determining a capacitance 66 for each of the hydrophones 22 in an operating environment, configuring a filter 36 based on the capacitance 66, and modifying a response of a channel of the hydrophone 22 using the filter 36. The apparatus includes an acquisition unit 20 having a geophone 24 and a hydrophone 22, a recording unit 30, a processing unit 31 and a filter 36 for correcting for variation between hydrophones 22 and changing a first order low frequency response of the hydrophone 22 to appear like a second order response like that of the geophone 24.

12 Claims, 3 Drawing Sheets

APPARATUS AND METHOD FOR CORRECTING FOR CAPACITANCE VARIATIONS IN HYDROPHONES

TECHNICAL FIELD

This invention relates in general to seismic surveys and, more specifically, to a method and apparatus for matching outputs of hydrophones to output of geophones using digital signal processing filters.

BACKGROUND OF THE INVENTION

Known methods of performing seismic surveys for formations under a body of water must overcome some unique problems, such as reflections at the air/water interface. When water depths increase beyond 30 to 40 feet, the period of the received reflection from the air/water interface and subsequent reverberations in the water column become too large for deconvolution algorithms to remove. If this energy is not removed from the processed data, reflecting horizons are unnecessarily complicated and fault planes are obscured.

Known methods employed to remove the water-column reverberations use simultaneous data from both hydrophones (pressure) and geophones (velocity) sensors. At certain places on the ocean bottom, typically called stations, a hydrophone and geophone are placed close to each other as a pair. When a water column reverberation arrives at the geophone/hydrophone pair, the hydrophone reacts with a polarity opposite that of the geophone. Therefore, when the pressure and velocity signals are summed unwanted reverberations should be significantly eliminated. However, the signals are not effectively eliminated because of the difference between signals from geophones and hydrophones. For example, at low frequencies a problem is that a geophone is a second order system with a dB roll-off approximately two times the hydrophone's dB roll-off, which is a first order system. Therefore, combining the measured response of a hydrophone with the measured response of the geophone results in poor cancellation of the unwanted reverberations.

Known methods of causing the hydrophone to behave like a second order system require using an inductance or transformer. The transformer inductance resonates with the hydrophone capacitance to produce a second order response resembling the response of the geophone in its low frequency amplitude and phase characteristics. However, using the transformer introduces additional variables that add distortion to the signal, especially at low frequencies. For example, the transformer inductance changes with signal level, thus causing a signal phase shift.

Furthermore, known methods have increased errors because the capacitance of hydrophones vary from hydrophone to hydrophone. Accordingly, the response of one hydrophone is not identical to the response of another hydrophone, even though the two hydrophones are at the same temperature.

Therefore what is needed is a method and an apparatus for modifying the response of a hydrophone to match the response of a geophone and significantly reduce response variations between hydrophones caused by inherent characteristics.

SUMMARY OF THE INVENTION

Accordingly, a method and an apparatus are provided for matching the response of a hydrophone to the response of a geophone and significantly reducing response variations between hydrophones caused by inherent characteristics. To this end, the method includes the steps of determining a capacitance of the hydrophone in its operating environment, configuring a filter based on the hydrophone capacitance to produce a transfer function, and modifying the response of a hydrophone channel using the filter. The apparatus includes a processing unit for generating a seismic image, a recording unit coupled to the processing unit for storing data and the seismic image, a filter coupled to the processing unit for correcting data, and an acquisition unit coupled to the filter for measuring the response of the formation to the seismic energy.

An advantage of the present invention is that the effects of and errors due to variations between hydrophone are significantly reduced.

Another advantage of the present invention is that the first order response of the hydrophone is transformed to a second order response like that of a geophone, thereby significantly improving water reverberation cancellation.

DETAIL DESCRIPTION

Figure 1:
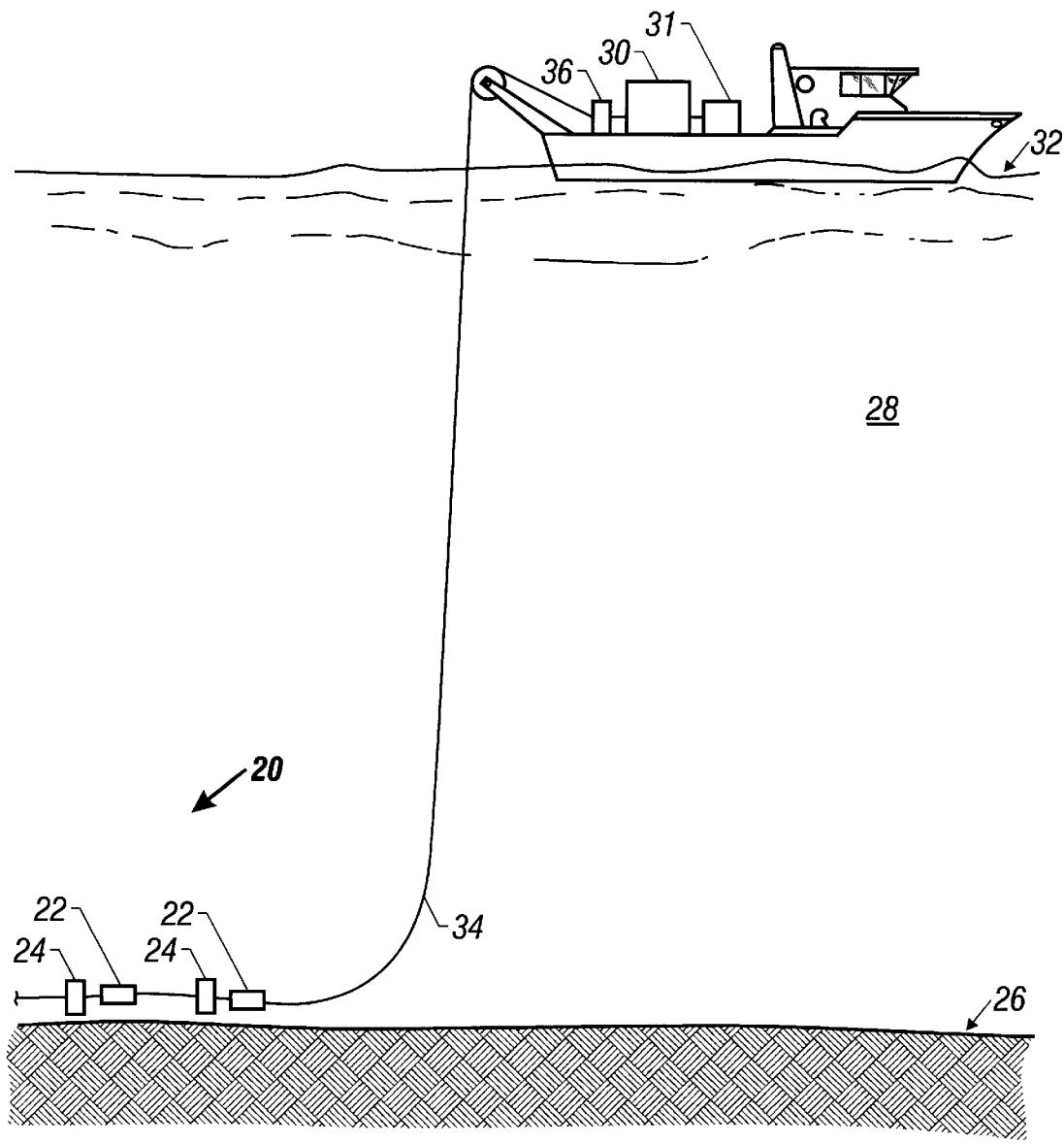
FIG. 1 illustrates an acquisition system located on a bottom surface of a body of water.

Referring to FIG. 1, in a bottom cable survey method, an acquisition system, generally designated 20, has multiple hydrophones 22 and geophones 24 grouped together at predetermined intervals. In one embodiment one hydrophone 22 is located in near proximity to one vertically aligned geophone 24. In another embodiment one hydrophone 22 is located in near proximity to one vertically aligned geophone 24 and two horizontally aligned geophones (not shown). The acquisition system 20 is located at a bottom 26 of a body of water 28 to measure seismic energy. The acquisition system 20 is coupled to a recording unit 30 and a processing unit 31, located at a surface 32 of the body of water 28, through a cable 34. The recording unit 30 records hydro measurements taken by the hydrophone 22 and geomeasurements taken by the geophone 24. A filter 36 is present to correct the hydro measurements, as discussed in detail below. Each hydrophone/geophone group along the cable 34 represents a unique source of data collection. Accordingly, each group has a separate channel for passing data from the group to the filter 36 and the recording unit 30. All data collected from the hydrophones 22 are coupled to the filter 36.

Figure 2:
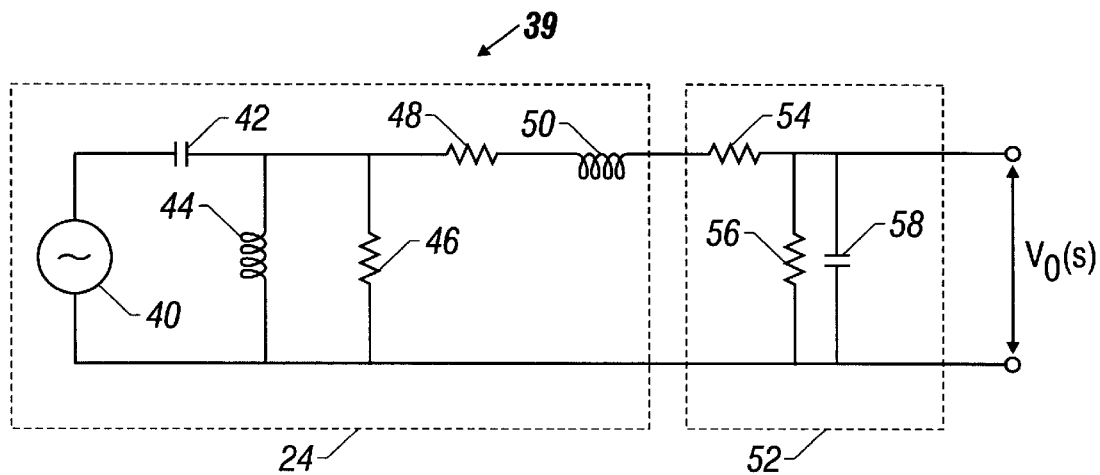
FIG. 2 illustrates a block diagram of the front end of a geophone channel used in the acquisition system of FIG. 1.

Referring now to FIG. 2, an electrical model, generally designated 39, of the geophone 24 includes a source 40, $V_i(s)$, which is an electrical representation of the seismic energy measured by the geophone 24, a geophone capacitance 42, a parallel geophone inductance 44, a parallel geophone resistance 46, a series geophone resistance 48, and a series geophone inductance 50. The source 40 produces electrical energy having a phase and an amplitude related to the velocity of the seismic energy. The output of the geophone 24 is connected to an amplifier input through a pre-amplifier 52. The pre-amplifier 52 has a series pre-amplifier resistor 54, a parallel pre-amplifier resistor 56, and a pre-amplifier capacitor 58. The geophone channel input is represented by the following equation derived using basic electrical network theory, such as Laplace transform theory, and omitted for clarity:

$$Hgeo(s) = \frac{N_2 \cdot s^2}{D_4 \cdot s^4 + D_3 \cdot s^3 + D_2 \cdot s^2 + D_1 \cdot s + D_0} \quad \text{equation (1)}$$

where $N_2$ is a predetermined constant, s is the Laplacian variable, and $D_4$, $D_3$, $D_2$, $D_1$, and $D_0$ are predetermined constants.

Figure 3:
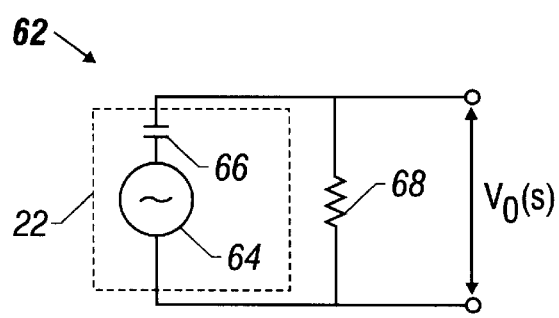
FIG. 3 illustrates a block diagram of the front end of a hydrophone channel used in the acquisition system of FIG. 1.

Referring now to FIG. 3, an electrical model, generally designated 62 of the hydrophone 22 has a source 64, $V_t(s)$, which is an electrical representation of the seismic energy measured by the hydrophone 22, and a hydrophone capacitance 66. The source 64 produces electrical energy having a phase and an amplitude corresponding to the pressure caused by the seismic energy. The value of the capacitance 66 in any given hydrophone 22 changes with variations in temperature and with variations in depth. The value of capacitance 66 also varies from one hydrophone to the next. Therefore, the user determines the value of the capacitance 66 at an operating temperature using a voltage driver (not shown) located in close proximity to the hydrophone 22 and a capacitance of known value. Furthermore, the user determines the value of the capacitance 66 for each hydrophone 22 because the response of the hydrophones 22 varies from hydrophone to hydrophone, even though each hydrophone 22 is at substantially the same temperature when deployed on the bottom 26. The user injects a test signal (not shown) into the hydrophone to produce a first test data set. Then the user electrically disconnects the hydrophone 22 using a switch (not shown). Then the user injects the test signal into the group to produces a second test data set. The user determines the value of the capacitance 66 by comparing the first test data set to the second test data set. A processing unit 31 adjusts coefficients of the filter 36 based on the capacitance 66 value for each of the hydrophones 22. The output of the hydrophone 22 is coupled to a termination resistor 68 and the correction amplifier 36. The resistor 68 and the capacitance 66 establish the uncorrected low end frequency response of the hydrophone 22. The hydrophone channel input is represented by the following equation derived using basic electrical network theory, such as Laplace transform theory, which is omitted for clarity:

$$Hhydro(s) = \frac{R2 \cdot Ch \cdot s}{R2 \cdot Ch \cdot s + 1} \quad \text{equation (2)}$$

where Ch is the hydrophone capacitance, s is the Laplacian variable, and R2 is a predetermined constant.

The response of the hydrophone 22 is corrected using a digital signal processing filter (DSPF). The filter 36 transforms the output of each of the hydrophones 22 to create a second order response, which appears to have originated from a geophone. The filter 36 is a bilinear transform of the following transfer function, which is derived by dividing equation (1) by equation (2):

$$(s) = \frac{Hgeo(s)}{Hhydro(s)} \quad \text{equation (3)}$$

$$= \frac{R2 \cdot Ch \cdot s + 1}{R2 \cdot Ch} \cdot \frac{N_2 \cdot s}{D_4 \cdot s^4 + D_3 \cdot s^3 + D_2 \cdot s^2 + D_1 \cdot s +}$$

Using the transfer function of equation (3), the filter 36 replaces the first order response with a second order response to give a phase and amplitude response that closely matches the response of a geophone.

Furthermore, the filter 36 compensates for changes in capacitance 66 variations caused by temperature or depth change.

Figure 4:
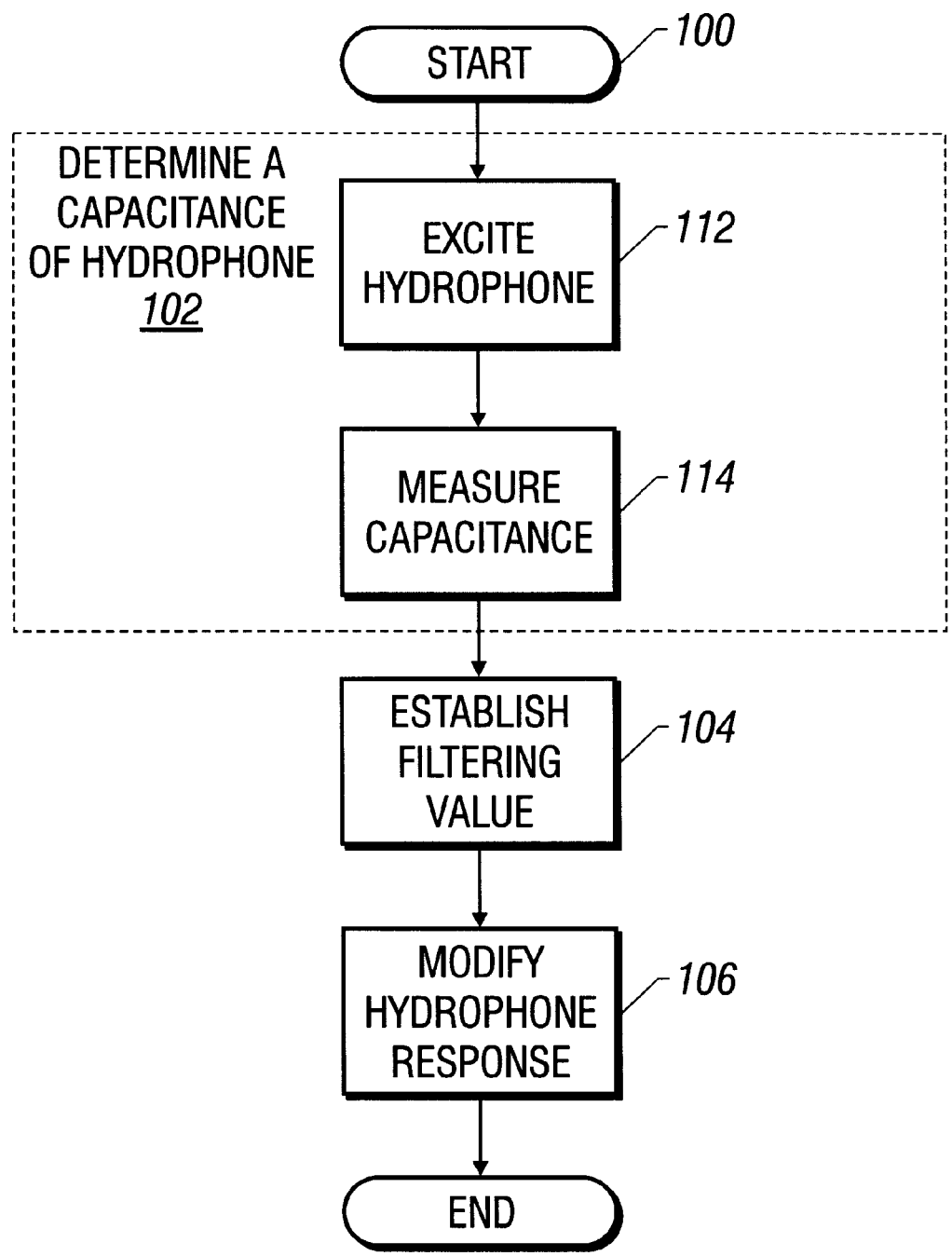
FIG. 4 is flowchart illustrating a process of transforming the hydrophone response to a second order response.

Referring now to FIG. 4, a process 100 is used for transforming a first order response of a hydrophone to a second order response. At step 102 the user determines the capacitance 66 of the hydrophones 22, FIG. 3. At step 104, the processing unit 31 establishes the filter coefficients for each hydrophone 22 that is used in the transfer function that the filter 36 applies to data produced by each of the hydrophones 22. At step 106 the filter 36 transforms the measurements produced by each of the hydrophones 22 from a first order response to a second order response like that of a geophone.

In order to determine the capacitance 66 for each of the hydrophones 22, the acquisition system 20 is located in the desired location, such as the bottom surface 26, FIG. 1. At step 112 each hydrophone 22 is excited using a predetermined voltage generated by the voltage driver. At step 114 the capacitance of each of the hydrophones 22 are measured.

In operation the user deploys the acquisition system 20 on the bottom surface 26 of a body of water. The user can survey the formations located below the bottom surface 26 using the acquisition system 20. The user determines a first capacitance value of the hydrophone 22 at one temperature, such as the temperature at the surface of a body of water being surveyed. The user places the hydrophone 22 in a desired location, such as the bottom of the body of water 26 and determines a second capacitance value of the hydrophone 22 at this working temperature. The user generates a seismic signal. The seismic signal travels through the formation and is reflected by the boundaries in the formation. The reflected signal return and is recorded by the acquisition system 20. The geophones 24 produce geomeasurements based on velocity of the reflected seismic energy. The geomeasurements are stored in the recording unit 30. The hydrophones 22 produce hydro measurements corresponding to the pressure caused by the seismic signal. The hydro measurements are processed using the transfer function set forth in equation (3) above. The processed hydro measurements are stored in the recording unit 30. The recorded data allows the user to later combine the geomeasurements and the hydro measurements to eliminate the unwanted reverberations and generate a seismic image of the formation.

In another embodiment of the present invention, the filter 36 can be implemented with s-domain sub-filters executing on data from various sampling rates. Accordingly, the bilinear transform is performed on or applied to each of the s-domain sub-filters to produce a sub-filter appropriate to the sample rate at which the sub-filter executes.

Although illustrative embodiments have been shown and described, a wide range of modifications, changes and substitutions is contemplated in the foregoing disclosure. In some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of transforming a first order response of a hydrophone excited by seismic energy as recorded by an acquisition system having both a geophone and the hydrophone to a second order response, the method comprises the steps of:

determining a capacitance of the hydrophone;

establishing a filter based on the capacitance of the hydrophone to produce a transfer function based on a predetermined criterion; and applying the filter to modify a response of a channel connected to the hydrophone.

2. The method of claim 1 wherein the predetermined criterion is based on a ratio in a frequency domain of a response of the geophone and the response of the hydrophone.

3. The method of claim 1 wherein the step of determining a capacitance comprises the steps of:

determining a response of the acquisition system excited by a predetermined voltage with the hydrophone electrically coupled to the acquisition system;

determining a response of the acquisition system excited by the predetermined voltage with the hydrophone electrically isolated from the acquisition system; and calculating the capacitance based on a comparison between the response of the acquisition system with the hydrophone electrically attached and the response of the acquisition system with the hydrophone electrically isolated.

4. The method of claim 1 wherein the filter is a digital filter.

5. The method of claim 4 wherein the digital filter is implemented in a digital signal processor.

6. The method of claim 1 wherein a portion of the filter is a digital filter.

7. The method of claim 6 wherein the digital filter is implemented in a digital signal processor.

8. The method of claim 4 wherein the digital filter is split into at least two sub-filters, with at least one of the sub-filters executed on data at a higher sample rate than at least one of the other sub-filters.

9. An apparatus for surveying a subsurface formation using seismic energy comprising:

a processing unit for generating a seismic image;

a recording unit coupled to the processing unit for storing data and the seismic image;

an acquisition unit coupled to the processing unit for measuring the response of the formation to the seismic energy;

a plurality of first order sensors coupled to the acquisition unit;

a plurality of second order sensors coupled to the acquisition unit; and a filter coupled to the processing unit having parameters for transforming responses of each of the plurality of first order sensors into a new response similar to a response of second order sensors.

10. The apparatus of claim 9 wherein the plurality of first order sensors are hydrophones.

11. The apparatus of claim 9 wherein the plurality of second order sensors are geophones.

12. The apparatus of claim 9 wherein each of the plurality of first order systems has a unique transfer function due to physical characteristics of the plurality of first order systems.

* * * * *